US009449567B2

(12) United States Patent
Chen et al.

(10) Patent No.: US 9,449,567 B2
(45) Date of Patent: Sep. 20, 2016

(54) COMMON VOLTAGE COMPENSATION IN DISPLAY APPARATUS

(71) Applicant: AU OPTRONICS CORPORATION, Hsinchu (TW)

(72) Inventors: Ying-Ji Chen, Hsinchu (TW); Kun-Lang Wu, Hsinchu (TW); Chih-Wei Wu, Hsinchu (TW); Teng-Liang Yu, Hsinchu (TW); Wen-Chieh Huang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 404 days.

(21) Appl. No.: 13/777,333

(22) Filed: Feb. 26, 2013

(65) Prior Publication Data

US 2014/0240302 A1 Aug. 28, 2014

(51) Int. Cl.

*G06F 3/038* (2013.01)
*G09G 5/00* (2006.01)
*G09G 3/36* (2006.01)

(52) U.S. Cl.

CPC .......... *G09G 3/3614* (2013.01); *G09G 3/3655* (2013.01); *G09G 3/3677* (2013.01); *G09G 2310/0262* (2013.01); *G09G 2320/0204* (2013.01); *G09G 2320/0223* (2013.01)

(58) Field of Classification Search

CPC . G09G 3/3614; G09G 3/3655; G09G 3/3677
USPC .......................................................... 345/212
See application file for complete search history.

(56) References Cited

U.S. PATENT DOCUMENTS 4,697,152 A 9/1987 Westwick
8,878,881 B2 11/2014 Li et al.

(Continued)

FOREIGN PATENT DOCUMENTS

CN 102243851 11/2011
JP H06250611 9/1994

(Continued)

OTHER PUBLICATIONS

Taiwanese Patent Office Search Report issued on Mar. 20, 2015, in corresponding Taiwanese patent application No. 10420353480 (9 pages).
International Search Report issued in international counterpart PCT/CN2014/070003 dated Mar. 27, 2014 (5 pages).

*Primary Examiner* — Kwang-Su Yang
(74) *Attorney, Agent, or Firm* — Ware, Fressola, Maguire & Barber LLP

(57) ABSTRACT

A method and a circuit component for suppressing crosstalk associated with the common voltage in a liquid crystal display are disclosed. In particular, in a liquid crystal display where the crosstalk is mainly caused by various control signals generated by a timing control circuit, one or more timing control signals are extracted from the timing control circuit and processed to become a compensation signal. The compensation signal is provided to display area of the liquid crystal display. The timing control signals generated by the timing control circuit include a start signal and a plurality of clock signals. The steps for processing these signals may include summing, inverting, high-pass filtering and amplitude adjustment, to be carried out in different orders and/or combinations. When the timing control signals are current signals, the steps for processing these signals may include current-to-voltage conversion, summing and inverting.

10 Claims, 13 Drawing Sheets

(56) References Cited

U.S. PATENT DOCUMENTS

| | | | | |
|---|---|---|---|---|
| 2005/0083115 | A1 | 4/2005 | Risbo | |
| 2009/0115499 | A1 | 5/2009 | Chiu et al. | |
| 2010/0110057 | A1 | 5/2010 | Lee et al. | |
| 2011/0187633 | A1 * | 8/2011 | Huang et al. | 345/94 |
| 2012/0075280 | A1 | 3/2012 | Liu et al. | |
| 2012/0293560 | A1 * | 11/2012 | Li et al. | 345/690 |
| 2013/0215096 | A1 * | 8/2013 | Kim | 345/212 |
| 2013/0229403 | A1 * | 9/2013 | Teranishi | 345/212 |
| 2013/0249966 | A1 | 9/2013 | Li et al. | |
| 2013/0314393 | A1 * | 11/2013 | Min et al. | 345/212 |

FOREIGN PATENT DOCUMENTS

| | | |
|---|---|---|
| JP | H07175453 | 7/1995 |
| TW | 200921607 | 5/2009 |
| TW | 201017304 | 5/2010 |
| TW | 201040916 | 11/2010 |
| TW | 201120847 | 6/2011 |
| TW | 201214375 | 4/2012 |
| TW | 201248598 | 12/2012 |
| TW | 201349205 | 12/2013 |

* cited by examiner

COMMON VOLTAGE COMPENSATION IN DISPLAY APPARATUS

FIELD OF THE INVENTION

The present invention relates to a display apparatus and, more specifically, to a display apparatus wherein the cross-talk interference is suppressed.

BACKGROUND OF THE INVENTION

To simplify the process of making a display apparatus having a liquid crystal display (LCD) panel, a gate driver circuit for driving the display panel is integrated in the display panel and disposed within the periphery circuit area of the display panel. The gate driver circuit so integrated is known as a gate driver-on-array (GOA) structure. FIG. 1 shows a general layout of a display panel having a GOA structure. As shown in FIG. 1, the display panel 10 has a display area 40, a gate driver area 30 to provide gate-line signals to a plurality of gate lines G1, G2, . . . , Gn. An external circuit/connector 20 is used to provide clock signals and data or source signals to the display panel 10. The external circuit 20 has a timing control circuit 22 to generate timing control signals (CS). Based on the received control signals, a voltage level shifter 23 provides the clock signals (CK) and a start signal VST to the gate driver in the gate drive area 30. The external circuit 20 also has a source signal generator 24 to provide the source signals (S) to the display area 40 in response to the control signals CS.

Polarity inversion is often used in a liquid crystal display to reduce the deterioration of the liquid crystal layer. In a liquid crystal display where a liquid crystal layer is located between two substrates and an electric field is applied between the two substrates to control the orientation of the liquid crystal molecules in the layer. Typically the lower substrate includes gate lines, data lines and pixel electrodes, whereas the upper substrate includes a common electrode applied with a common voltage. The liquid crystal layer may be deteriorated if the electric field between the pixel electrodes and the common voltage maintains a fixed direction. Thus, the polarity of the voltage drop across the upper substrate and the lower substrate is periodically inverted.

In a display apparatus adopting the polarity inversion scheme, electrical coupling between the common electrode and various signals provided to the pixel electrodes may produce undesirable interference known as crosstalk.

SUMMARY OF THE INVENTION

The present invention provides a method and a circuit component to suppress the crosstalk in a liquid crystal display. In particular, the crosstalk is mainly caused by various control signals generated by a timing control circuit which is part of an external circuit.

Thus, the first aspect of the present invention is a method of compensating a common voltage in a display apparatus, the display apparatus comprising a display area and one or more peripheral components spaced from the display area, the display area comprising a plurality of display components configured to receive a plurality of display signals and control signals from the peripheral components, the display area configured to display an image representative of the display signals in relationship to the common voltage in response to the control signals, said method comprising:

obtaining one or more of the control signals from the peripheral components;

processing said one or more of the control signals for generating a processed signal; and providing the processed signal to the display area for compensating the common voltage.

According to one embodiment of the present invention, the one or more of the control signals are indicative of one or more clock signals arranged for controlling a timing of the display components, and a start signal arranged for starting a frame in the image.

According to one embodiment of the present invention, the method further comprises adjusting an amplitude of the processed signal before providing the processed signal to the display area.

According to some embodiments of the present invention, the processing comprises summing said one or more of the control signals for providing a summed signal, and inverting a polarity of the summed signal to form the processed signal.

According to one embodiment of the present invention, the processing further comprises high-passing filtering the summed signal before or after the summed signal is inverted to form the processed signal.

According to another embodiment of the present invention, the one or more of the control signals obtained from the peripheral components comprises a plurality of current signals, and the processing comprises:

converting the current signals to a plurality of voltage signals;

summing the voltage signals for forming a summed signal;

adjusting an amplitude of the summed signal for forming the processed signal; and inverting a polarity of the summed signal before or after said adjusting.

The second aspect of the present invention is a display apparatus, a display panel comprising a display area, the display area comprising a plurality of display components;

a plurality of peripheral components spaced from the display area, the display components configured to receive a plurality of display signals and control signals from the peripheral components, the display area configured to display an image representative of the display signals in relationship to a common voltage in response to the control signals; and one or more signal lines arranged to provide a compensation signal to the display area to compensating the common voltage, wherein the compensation signal is indicative of a processed signal of one or more of the control signals obtained from the peripheral components.

According to various embodiments of the present invention, the peripheral components comprise a timing control circuit configured to providing the control signals;

a voltage level shifter configured to shift a voltage level of the control signals before providing the control signals to the display area; and a compensation-signal generator configured to receive one or more of the control signals from the timing control circuit and configured for processing said one or more of the control signals to form the processed signal.

According to some embodiments of the present invention, the one or more of the control signals are indicative of a start signal arranged for starting a frame in the image, and a plurality of clock signals arranged for controlling a timing of the display components, and the processing comprises:

high-pass filtering said one or more of the control signals for providing a plurality of high-pass filtered signals;

summing said high-pass filtered signals for providing a summed signal; and adjusting an amplitude of the summed signal to form the processed signal.

According to one embodiment of the present invention the adjusting comprises inverting a polarity of the summed signal.

According to another embodiment of the present invention, the one or more of the control signals comprise current signals indicative of a start signal arranged for starting a frame in the image, and a plurality of clock signals arranged for controlling a timing of the display components, and the processing comprises:

converting the current signals into a plurality of voltage signals indicative of the start signal and the clock signals;

summing the voltage signals for providing a summed signal, adjusting an amplitude of the summed signal to form the processed signal and inverting a polarity of the summed signal.

According one embodiment of the present invention, the display apparatus further comprises an external circuit electrically connected to the display panel, wherein the external circuit comprises the timing control circuit, the voltage level shifter and the compensation-signal generator, and wherein the display panel comprises a gate driver area adjacent to the display area, the gate driver area comprising a gate driver circuit configured to receive the control signals from the voltage level shifter, the gate driver circuit configured to provide a plurality of gate-line signals to the display components responsive to the control signal, the external circuit further comprising a source signal generator configured to receive the control signals from the timing control circuit and to provide the display signals to the display area responsive to the control signals.

According to the present invention, the display area comprises a first side adjacent to the gate driver area and an opposing second side, and the compensation signal is provided to the display area on one or both of the first side and the second side.

According to the present invention, each of the display components comprises an electrode arranged to receive a display signal responsive to a gate-line signal; and a capacitor having one capacitor end connected to the electrode and an opposing capacitor end arranged to receive the compensation signal.

According to one embodiment of the present invention, the compensation signal is further indicative of the common voltage and/or a DC voltage.

DETAILED DESCRIPTION

Figure 1:
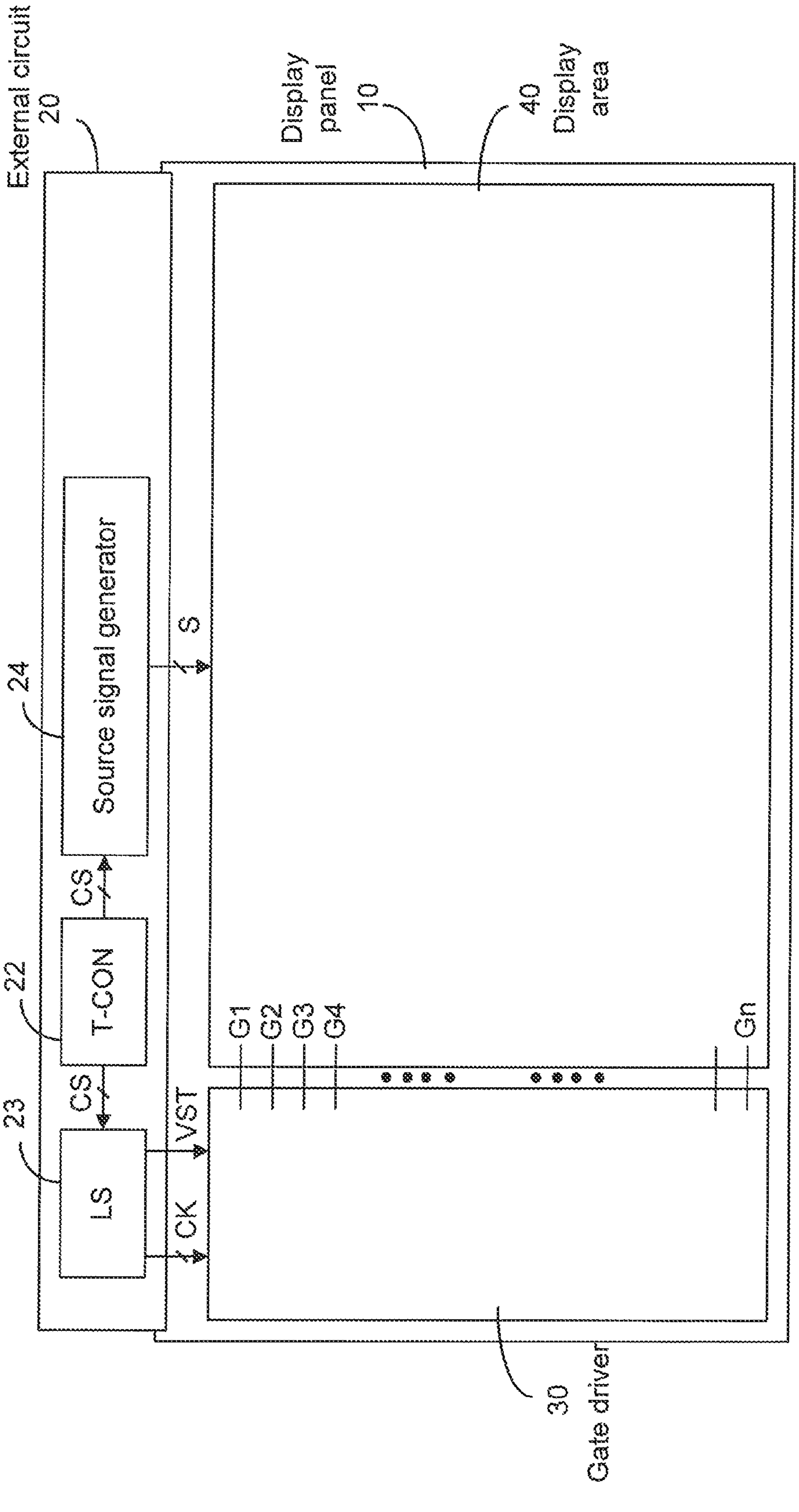
FIG. 1 (prior art)
FIG. 1 shows a typical display apparatus having a display panel connected to an external circuit.
Figure 2A:
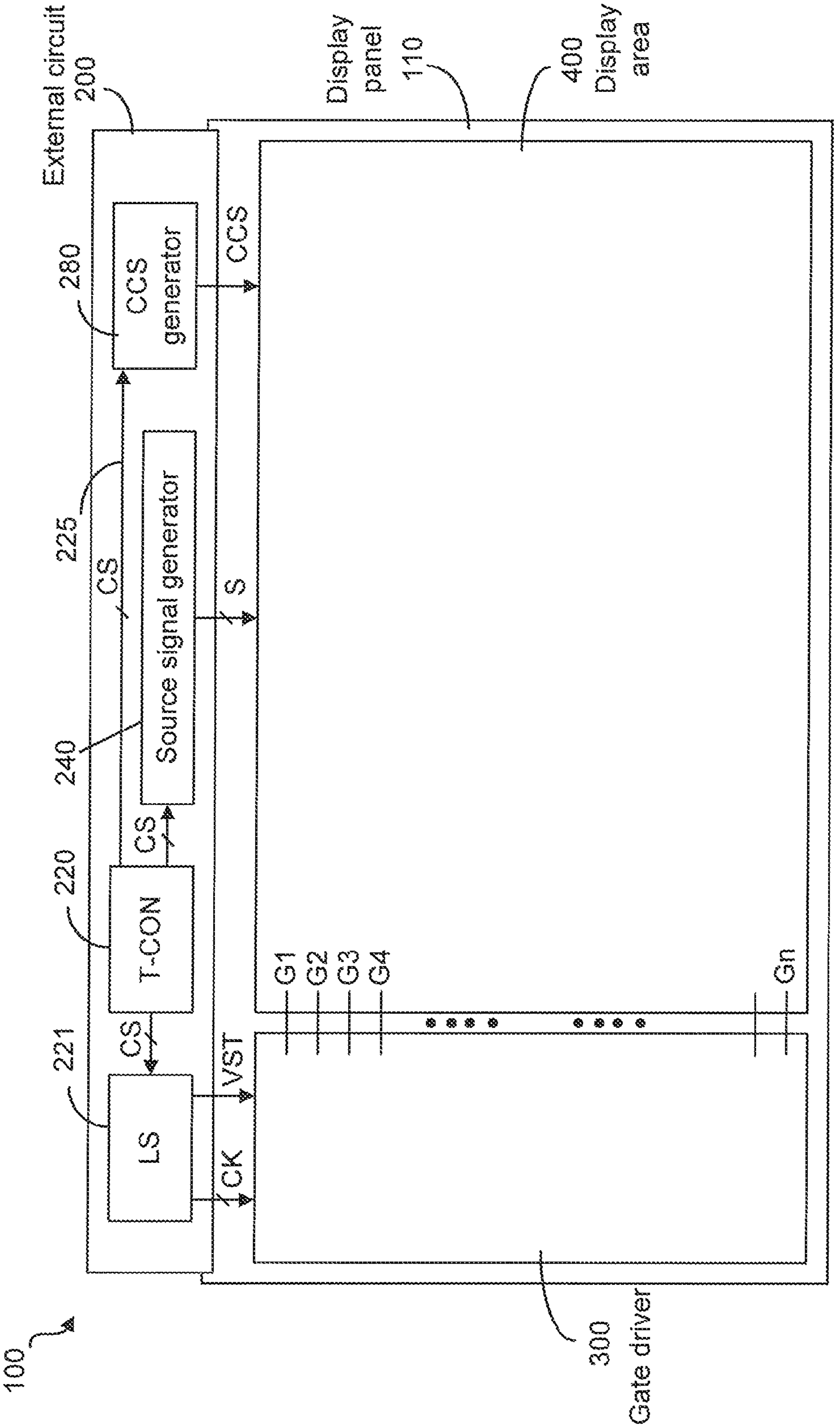
FIG. 2*a* shows a display apparatus according to one embodiment of the present invention.

It is known in the art that the image on a display panel, such as a LCD panel, is composed of a plurality of pixels arranged in a two-dimensional array of columns and rows or lines. Each line of pixels is activated or charged by a gate signal provided by the gate-line driver on a gate line and each column of the pixels is arranged to receive a source or data signal in reference to a common voltage on a common electrode. In a display apparatus adopting the polarity inversion scheme, electrical coupling occurs between the common electrode and various signals provided to the pixel electrodes. This electrical coupling is referred to as crosstalk. In order to minimize crosstalk, the present invention provides a compensation signal CCS to the display area in a display apparatus such as a display apparatus 100 as shown in FIG. 2*a*. As shown in FIG. 2*a*, the display apparatus 100 comprises a display panel 110 and an external circuit 200. The display panel 110 has a display area 400, and a gate driver area 300 to provide gate-line signals to a plurality of gate lines G1, G2, . . . , Gn. The external circuit 200 has a timing control circuit 220 to provide timing control signals CS to a voltage level shifter 221, which, in turns, provides a plurality of clock signals (CK) and a start signal (or frame start signal) VST to the gate driver in the gate drive area 300. The external circuit 200 also has a source signal generator 240 to provide a plurality of source signals (S) to the display area 400 at least partly based on the timing control signals CS. The compensation signal CCS, according to various embodiments of the present invention, is generated based on the various signals provided by the timing control circuit 220. As shown in FIG. 2*a*, the external circuit 200 has a compensation-signal generator 280 electrically connected to the timing control circuit 220 by signal lines 225 to receive the various timing control signals such as clock signals and start signal without being level-shifted.

Figure 2B:
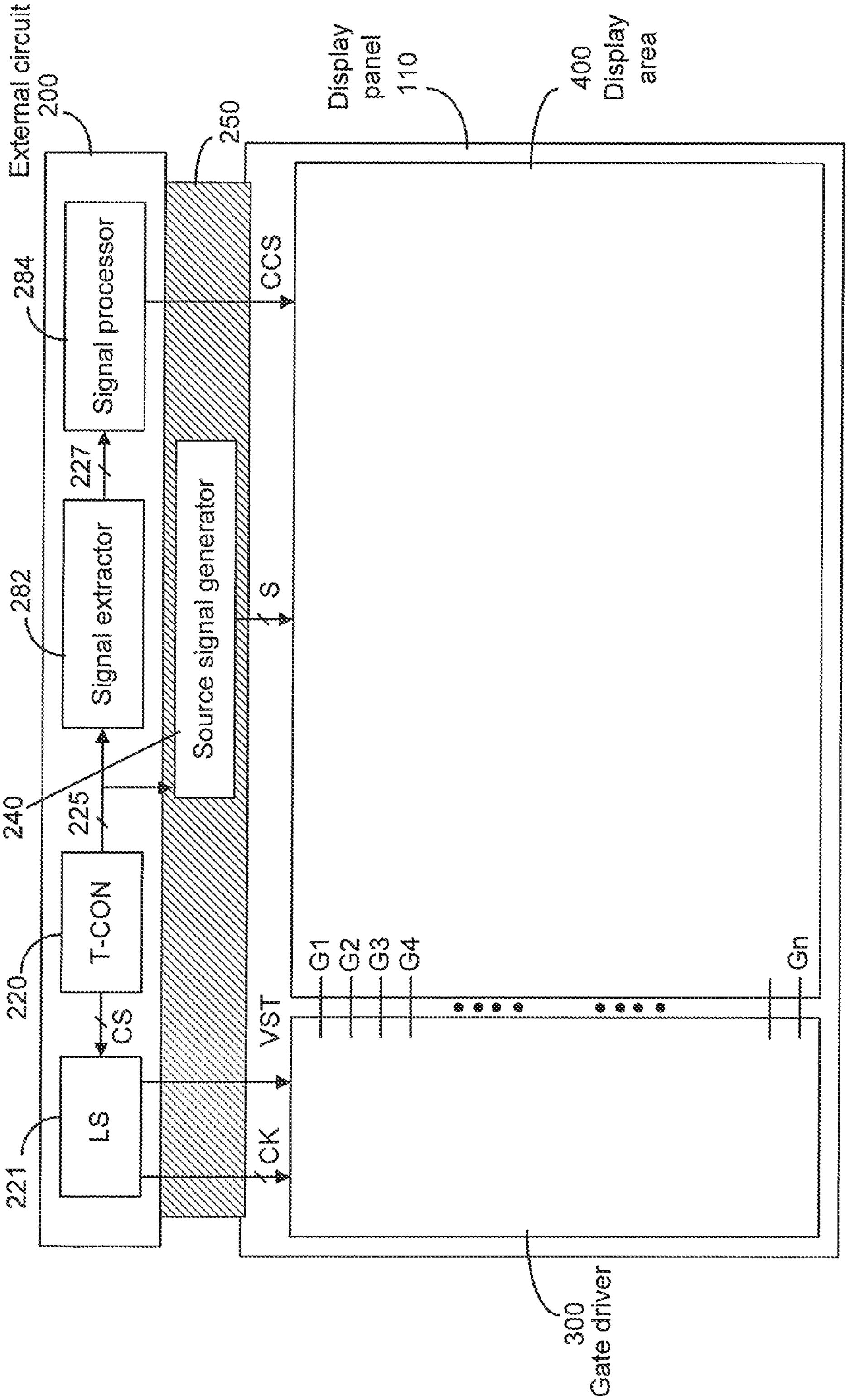
FIG. 2*b* shows a display apparatus according to another embodiment of the present invention.

In a different embodiment of present invention, the external circuit 200 is connected to the display panel 110 via a connector 250 as shown in FIG. 2*b*. The connector 250 can be a printed film having one or more integrated circuits thereon. For example, the connector 250 has one or more source signal generators 240 for providing the source signals S to the display area 400. In a display panel wherein m pixels or sub-pixels are arranged in a row, the number of the source signals is m, or m/2, depending on the design of the display area (see FIGS. 7*a* and 7*b*, for example). The compensation-signal generator 280 (see FIG. 2*a*) may comprise two or more separate circuits such as a signal extractor 282 and a signal processor 284. The signal extractor 282 may comprise a high-pass filter circuit for high-pass filtering the various signals provided by the timing control circuit 220. The high-pass filtered signals are provided to the signal processor 284 via signal lines 227.

Figure 3:
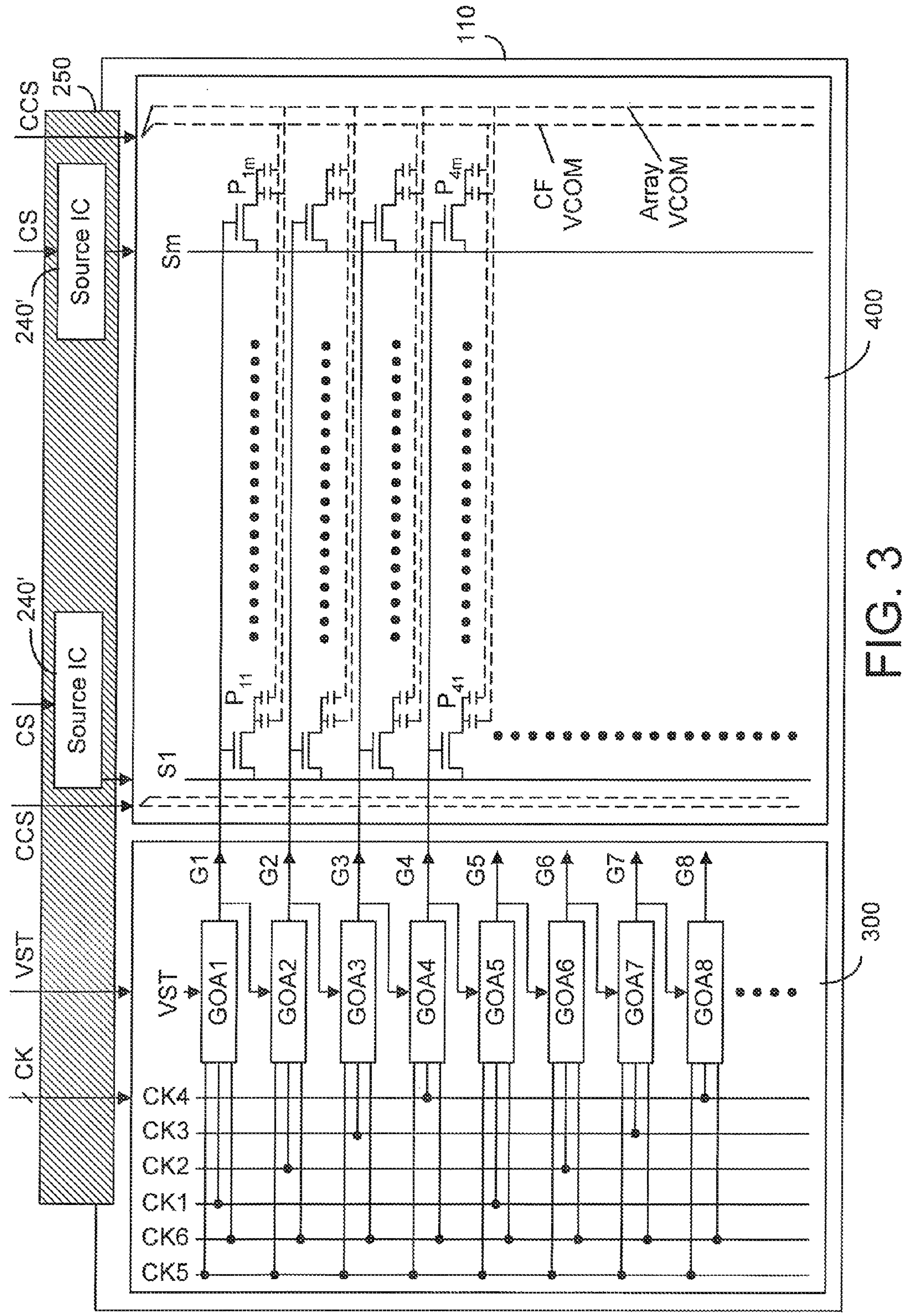
FIG. 3 shows how the compensation signal is used according to some embodiments of the present invention.
Figure 4:
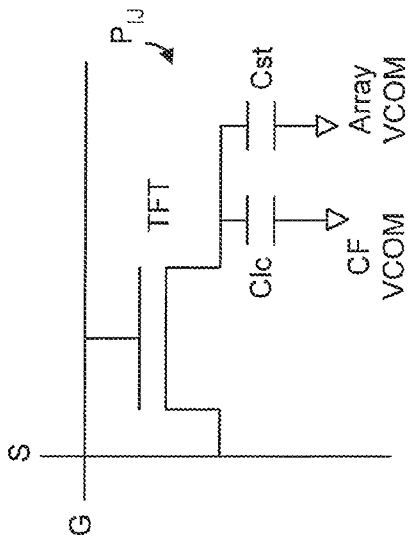
FIG. 4 shows a pixel or sub-pixel that uses the compensation signal, according to various embodiments of the present invention.

FIG. 3 shows how the compensation signal is used according to some embodiments of the present invention. As shown in FIG. 3, the display panel has a plurality of pixel rows and each row has m pixels or sub-pixels Pij in the display area 400. Each of the sub-pixels has a switching element (TFT), which acts as a display component to turn the sub-pixel on or off. There are m source signal lines S1, . . . Sm to provide the source signals or data signals to the switching elements in the pixels or sub-pixels. The source signal generator 240 as shown in FIGS. 2*a* and 2*b* can be implemented as an integrated circuit, or a Source IC 240' as shown in FIG. 3. Each pixel or sub-pixels effectively comprises two capacitors, Clc and Cst (see FIG. 4). The compensation signal CCS can be used on one or both of the capacitors as signal CF VCOM (on Clc) and Array VCOM (on Cst). The capacitor Clc is the capacitance between the pixel electrode (not shown) in a pixel or sub-pixel and the common electrode (not shown) in a display panel, associated with the liquid crystal layer between the two substrates in the display panel. The capacitor Cst is a storage capacitor associated with a pixel or sub-pixel. According to various embodiment of the present invention, CF VCOM can be a DC voltage, a GROUND, CCS, or CCS combined with a DC voltage; Array VCOM can be a DC voltage, a GROUND, CCS, or CCS combined with a DC voltage. As shown in FIG. 3, the compensation signal CCS may be provided to one side or both sides of the display area 400.

Figure 5:
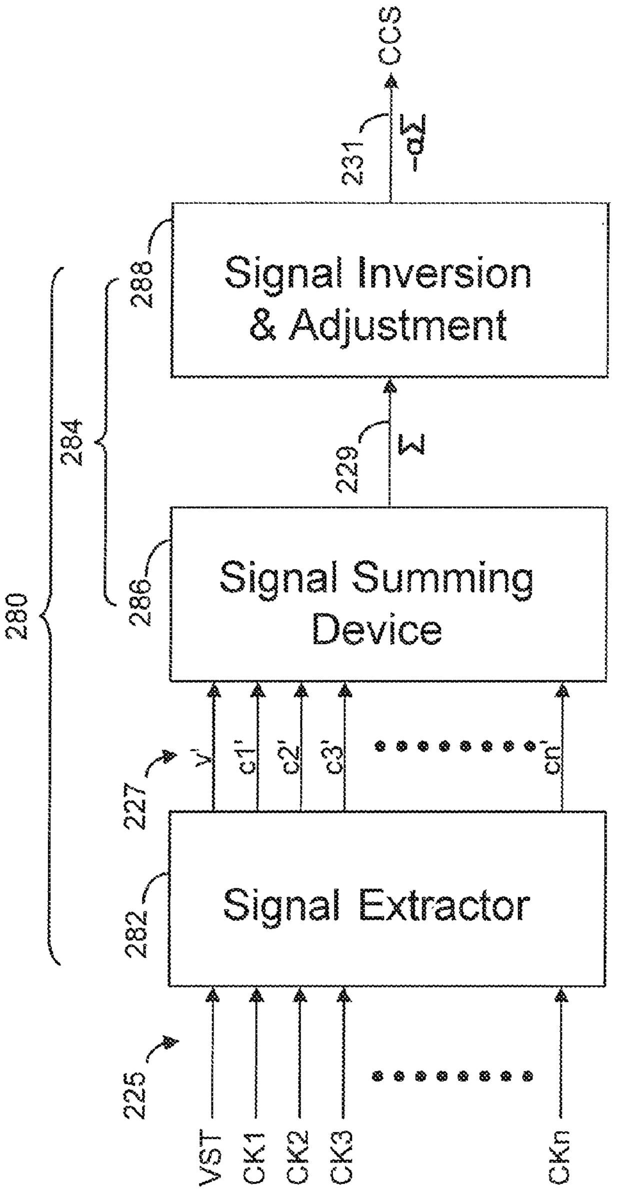
FIG. 5 shows an exemplary structure of the compensation-signal generator, according to one embodiment of the present invention.
Figure 8:
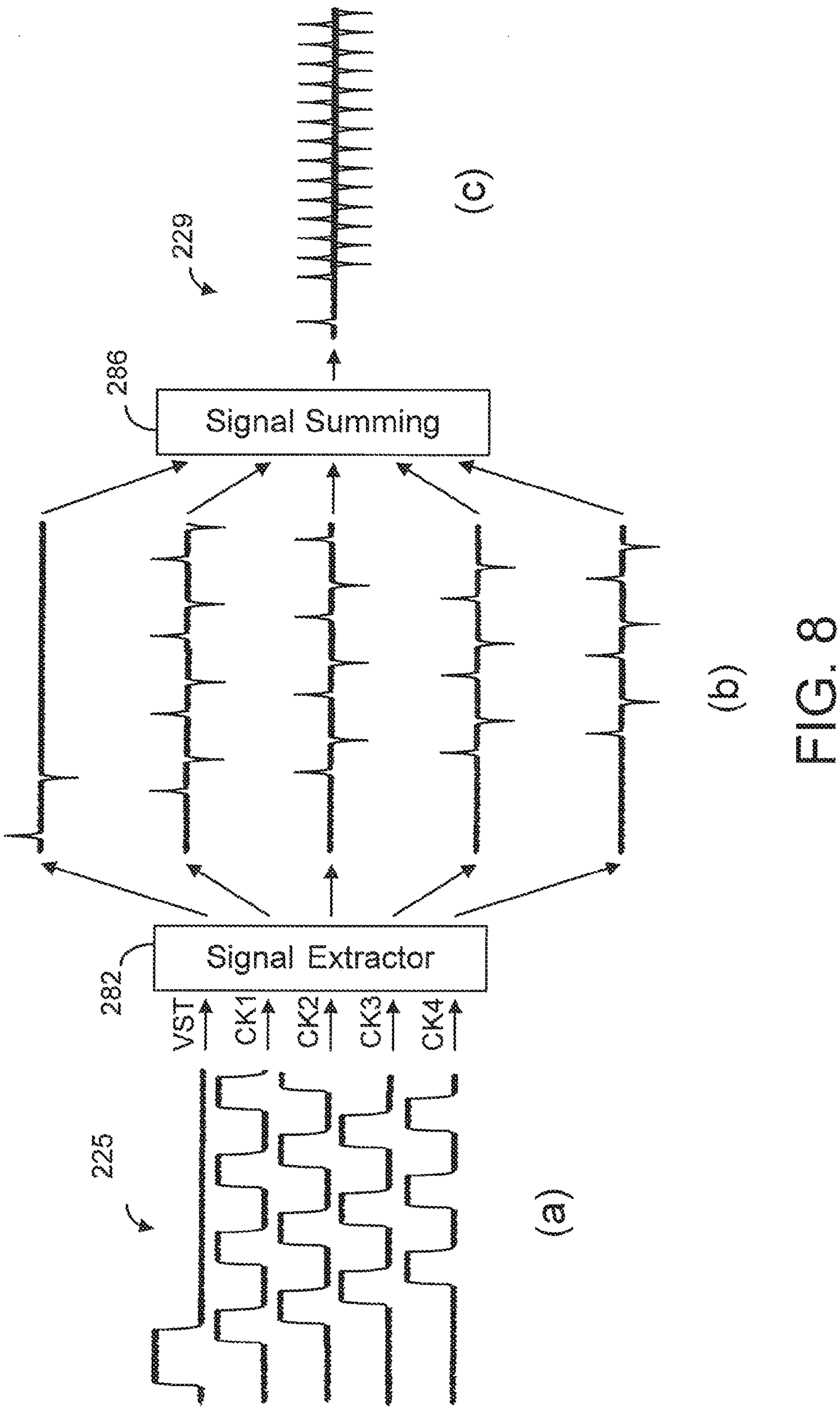
FIG. 8 shows the timing plots of the signals involved in the generation of compensation signal at various stages, according to one embodiment of the present invention.
Figure 8:
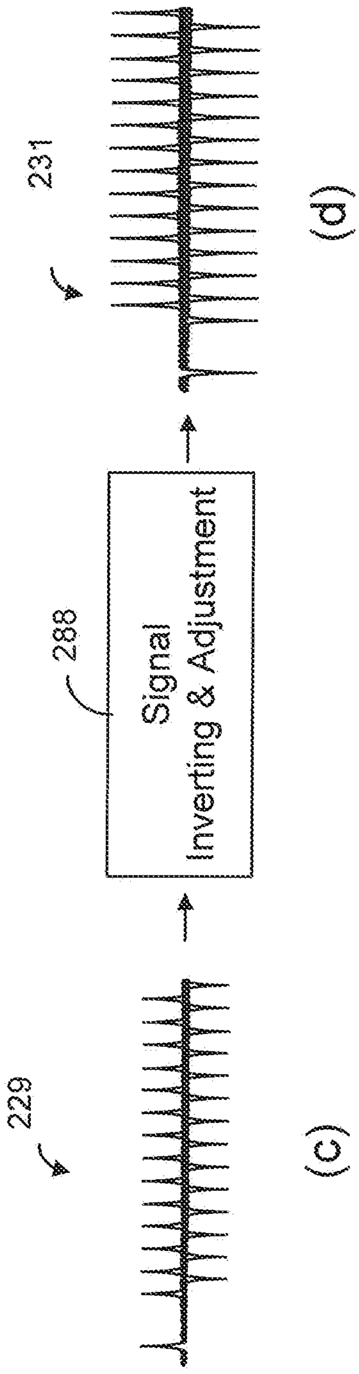
Figure 9:
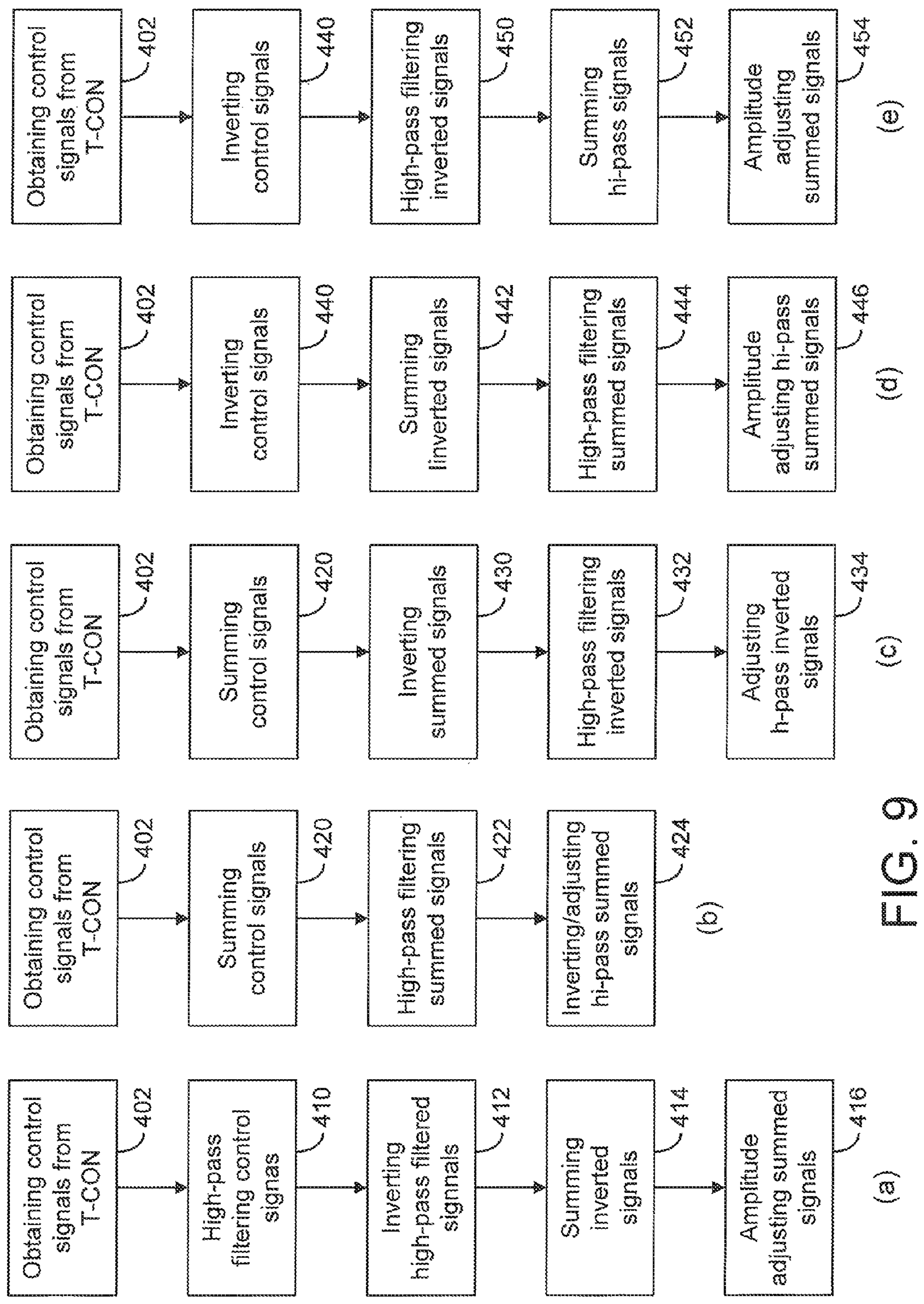
FIGS. 9*a*-9*e* show various steps in the generation of compensation signal.

As shown in FIG. 5, the compensation-signal generator 280 may comprise a signal extractor 282, a signal summing device 286 and a signal inversion/adjustment device 288. The signal summing device 286 and the signal inversion/adjustment device 288 can be part of the signal processor 284 as shown in FIG. 2*b*. The signal extractor 282 is configured to receive various timing control signals such as start signal VST, clock signals CK1, . . . , CKn, from the timing control circuit 220 (see FIGS. 2*a* and 2*b*, without being level-shifted). The signal extractor 282 may comprise a high-pass filtering circuit to filter the received signals. The high-pass filtered signals are presented at the output of the signal extractor 282 on a plurality of signal lines 227. The high-pass filtered signals are denoted as v', c1', . . . , cn' corresponding to the received signals VST, CK1, . . . , CKn. Typically the start signal VST and the clock signals CK comprise one or more rectangular pulses. After high-pass filtering, each of the rectangular pulses produces two time-derivative signals, each at an edge of the rectangular pulses, as shown in FIG. 8.

In general, the crosstalk in a display panel is at least partially caused by these rectangular pulses. In order to minimize the crosstalk, the time-derivative or high-pass filtered signals v', c1', . . . , cn' are summed in the signal-summing device 286. The sum of these high-pass filtered signals is denoted as Σ and presented at the output of the summing device 286 on a signal line 229. A signal inversion/adjustment device 288 inverts the polarity of the summed signal Σ and adjusts its amplitude by a factor α and presents the adjusted/inverted summed signal on signal line 231 as the compensation signal CCS. Thus, the compensation signal CCS is indicative of ($-\alpha\Sigma$).

The adjustment factor α is generally determined by comparing the actual crosstalk and the amplitude of the summed signal Σ. The adjustment factor α is generally ranged from 1 to 3 but it can be smaller or greater.

Figure 6A:
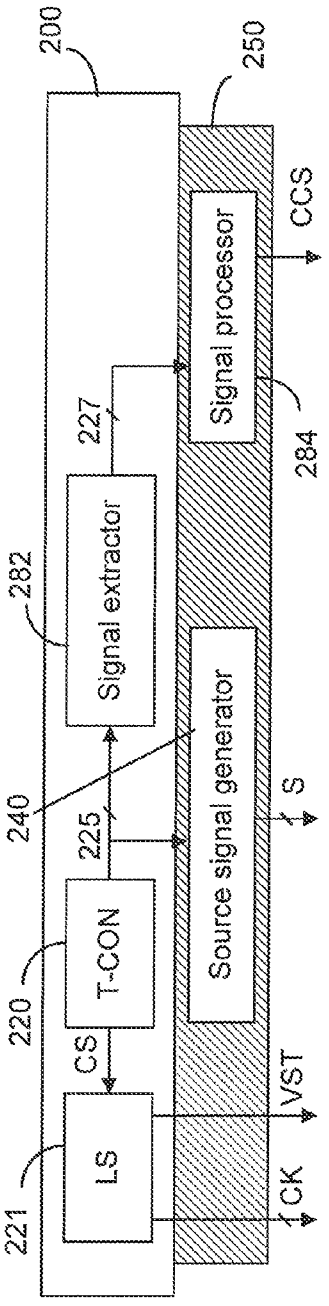
FIG. 6*a* shows part of the compensation-signal generator is located on the connector, according to one embodiment of the present invention.
Figure 6B:
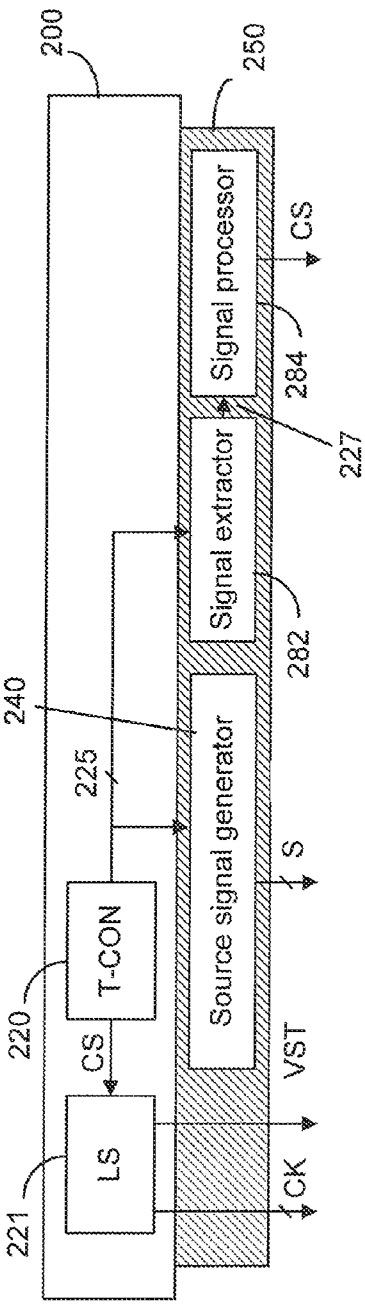
FIG. 6*b* shows the entire compensation-signal generator is located on the connector, according to another embodiment of the present invention.
Figure 6C:
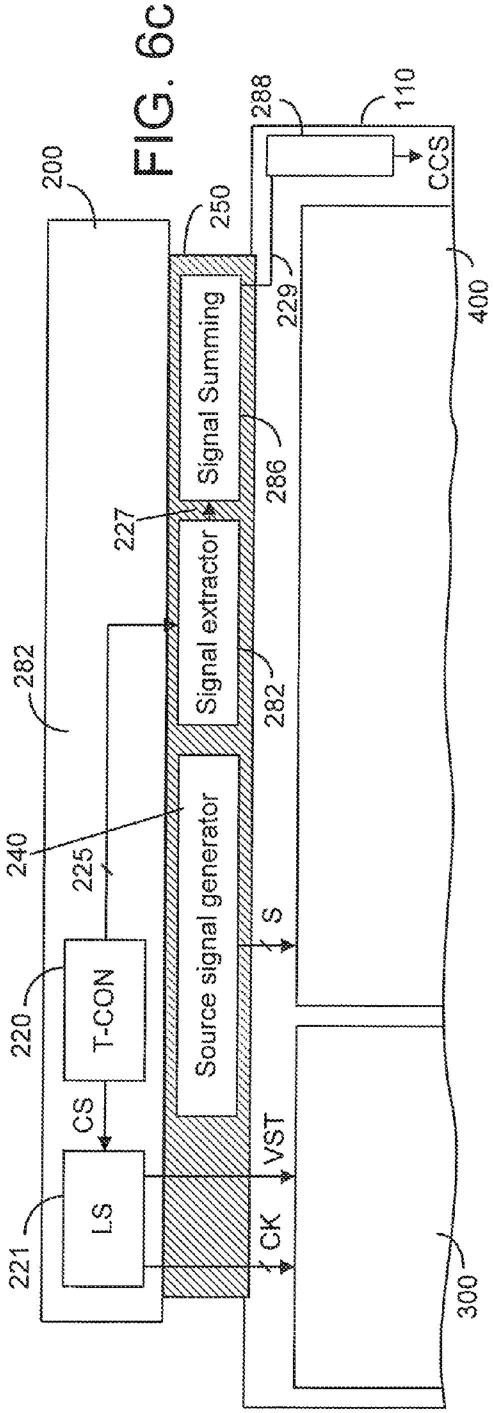
FIG. 6*c* shows part of the compensation-signal generator is located on the display panel, according to one embodiment of the present invention.
Figure 6D:
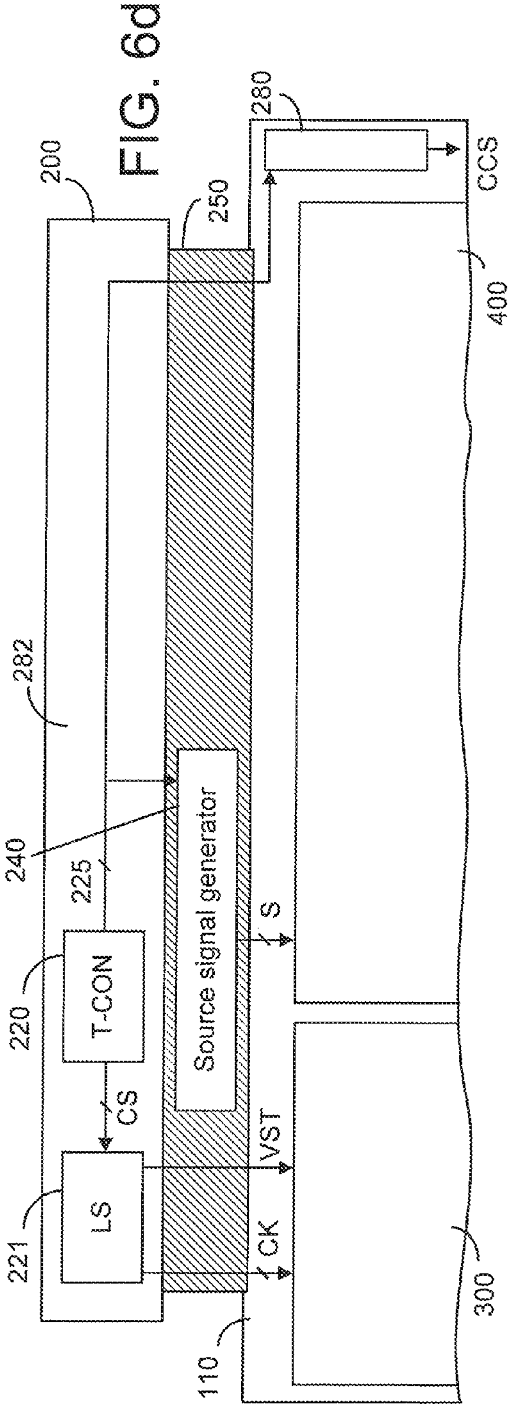
FIG. 6*d* shows the entire compensation-signal generator is located on the display panel, according to another embodiment of the present invention.

The present invention provides a method of crosstalk minimization using the processed signals of various timing control signals received from the timing control circuit 220. The apparatus for process the control signals from the timing control circuit 220 may comprise a compensation-signal generator 280 as shown in FIG. 5. In general, the compensation-signal generator 280 is located in a neighboring area or adjacent area of the display area 400. The neighboring area may comprise the external circuit 200, the connector 250 and some area that is located on the display panel 110 but spaced from the display area 400. For example, the entire compensation-signal generator 280 (including the signal extractor 282 and the signal processor 284) may be located on the external circuit 200 as shown in FIGS. 2*a* and 2*b*. According to one embodiment of the present invention, the signal processor 284 of the compensation-signal generator is located on the connector 250 while the signal extractor 282 is located on the external circuit 200 to receive various control signals from the timing control circuit 220 as shown in FIG. 6*a*. According to another embodiment of the present invention, the entire compensation-signal generator, including the signal extractor 282 and the signal processor 284, is located on the connector 250 as shown in FIG. 6*b*. According to yet another embodiment of the present invention, the signal extractor 280 and the signal summing device 286 of the compensation-signal generator are located on the connector 250, but the signal-inversion/adjustment device 288 is located on the display panel 110. As shown in FIG. 6*c*, the signal-inversion/adjustment device 288 is located adjacent to but spaced from the display area 400. In a different embodiment of the present invention, the entire compensation-signal generator 280 is located on display panel 110, adjacent to but spaced from the display area 400, as shown in FIG. 6*d*.

Figure 7B:
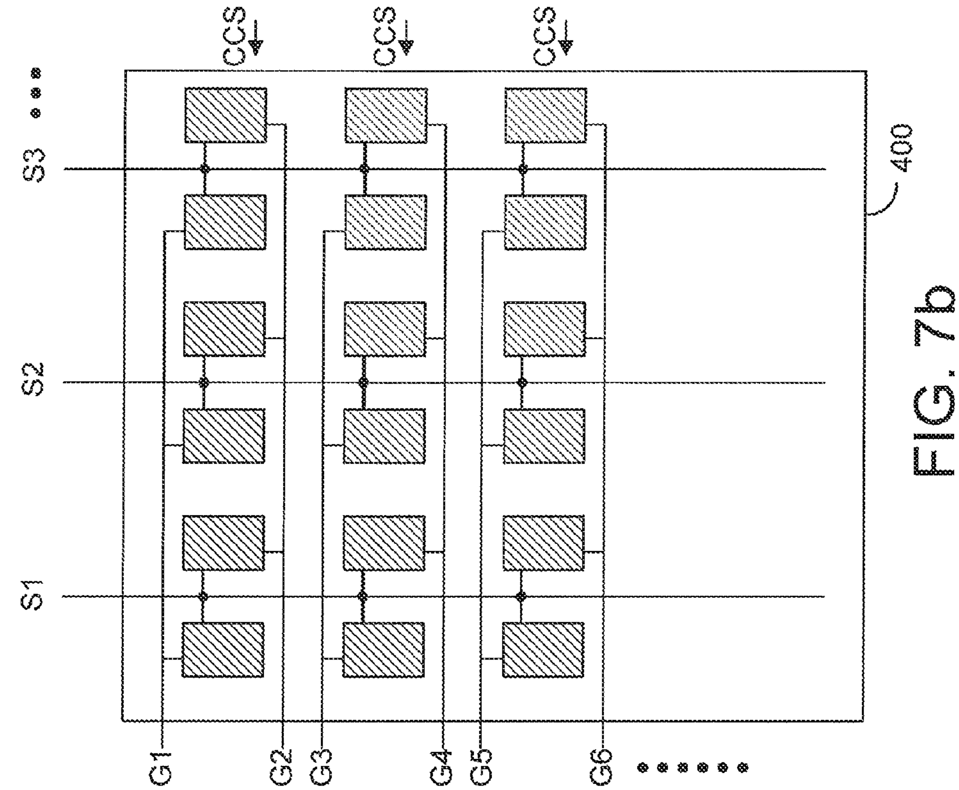
FIG. 7*b* shows the use of compensation signal on a different display panel, according to another embodiment of the present invention.
Figure 7A:
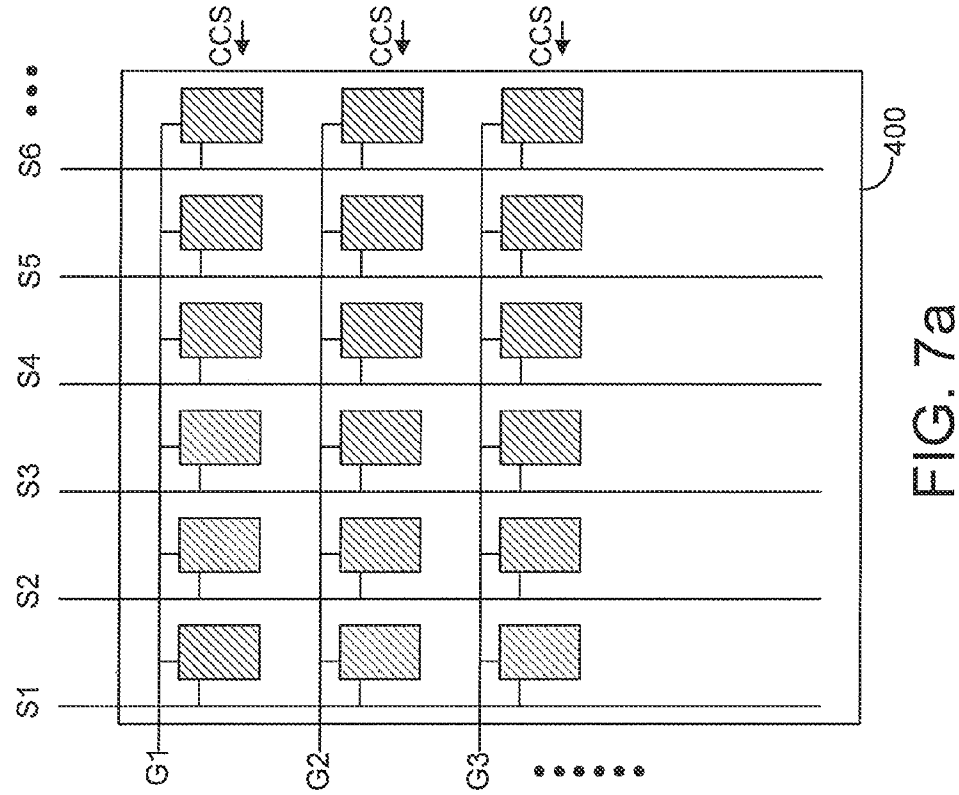
FIG. 7*a* shows the use of compensation signal on a display panel, according to one embodiment of the present invention.

FIG. 7*a* shows the use of compensation signal CCS on a display panel, according to one embodiment of the present invention. In the display panel 400 as shown in FIG. 7*a*, the pixels or sub-pixels are arranged in a plurality of rows and columns. Each row is arranged to receive a different gate line signal G and each column is arranged to receive a source signal S. The pixels or sub-pixels can also be arranged in a different manner as shown in FIG. 7*b*. As shown in FIG. 7*b*, two adjacent columns of pixels or sub-pixels share a source line. The display panel that uses this arrangement is called Half-Source Driver (HSD) panel.

FIG. 8 shows the timing plots of the signals involved in the generation of compensation signal at various stages. In FIG. 8(*a*), the timing control signals 225 obtained from the timing control circuit are VST, CK1, . . . . Each of the control signals comprises one or more (positive) rectangular pulses.

After being high-pass filtered in the signal extractor 282, the high-pass filtered signal (or time-derivative signal) of start signal VST has a positive peak and a negative peak, whereas the high-pass filtered signal of each of clock pulses CK1, CK2, . . . has a series of positive peaks and negative peaks occurring alternately as shown in the signals 227 in FIG. 8(*b*). The high-pass filtered signals 227 are summed in a summing device 286 to become a summed high-pass filtered signal 229 as shown in FIG. 8(*c*). It is followed that the amplitude of the summed high-pass filtered signal 229 is inverted and adjusted to become a compensation signal 231. The timing-plot of the compensation signal 231 is shown in FIG. 8(*d*).

It should be understood that the method of compensation-signal generation, according to the present invention, can be carried out in different orders. For example, after the various control signals (VST, CK1, . . . ) are obtained, directly or indirectly, from the timing control circuit 220, they are high-pass filtered in the signal extractor 282 into high-pass filtered signals (v', c1', . . . ), the high-pass filtered signals are summed in the signal summing device 286 into a summed signal Σ. The summed signal Σ is then inverted into inverted summed signal −Σ. The amplitude of inverted summed signal is adjusted by an adjustment factor α. The inverted and adjusted summed signal −αΣ can be used as a compensation signal CCS as shown in FIGS. 5 and 8. However, after the step of obtaining the control signals from the timing control circuit 220 at step 402, the high-pass filtering step, the summing step, the inverting step and the amplitude adjusting step can be carried out in different orders as shown in FIGS. 9*a*-9*e* below: (a) high-pass filtering (410)->inverting (412)->summing (414)->amplitude adjusting (416) (*b*) summing (420)->high-pass filtering (422)->inverting and amplitude adjusting (424) (*c*) summing (420)->inverting (430)->high-pass filtering (432)->amplitude adjusting (434) (*d*) inverting (440)->summing (442)->high-pass filtering (444)->amplitude adjusting (446) (*e*) inverting (440)->high-pass filtering (450)->summing (452)->amplitude adjusting (454).

Figure 10:
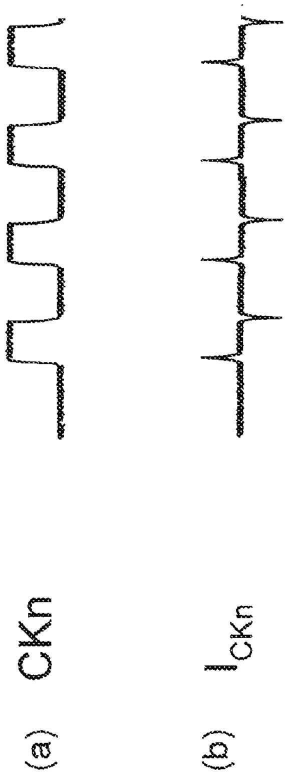
FIG. 10 shows the relationship between a voltage timing control signal and a current timing control signal.
Figure 11:
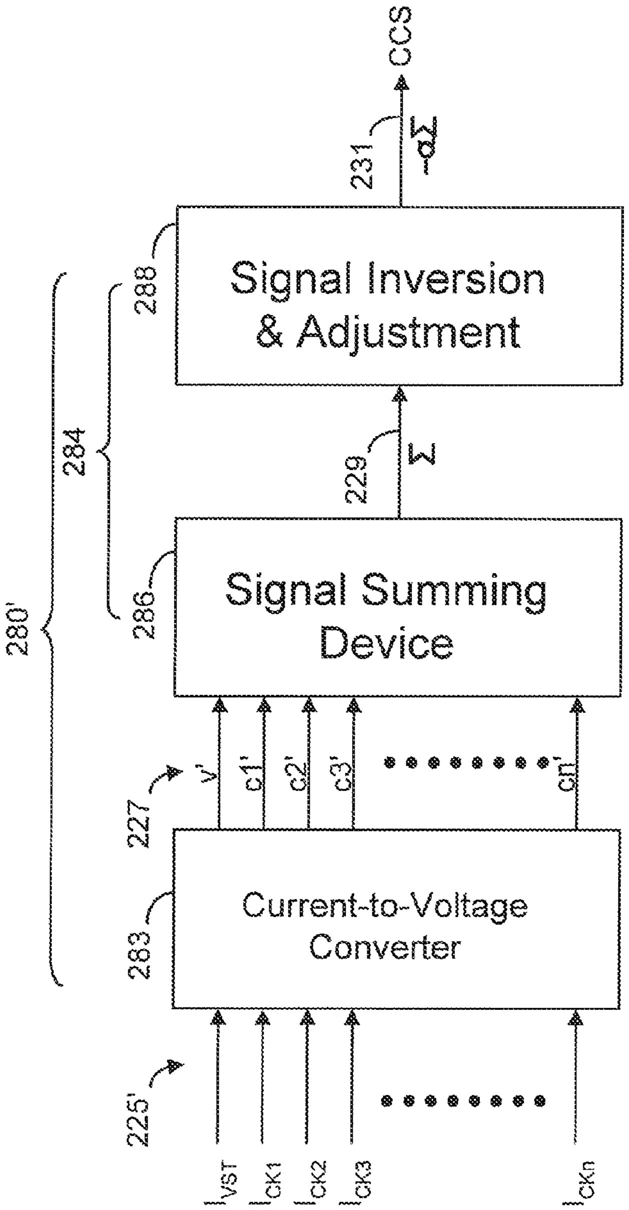
FIG. 11 shows an exemplary structure of the compensation-signal generator, according to another embodiment of the present invention.
Figure 12:
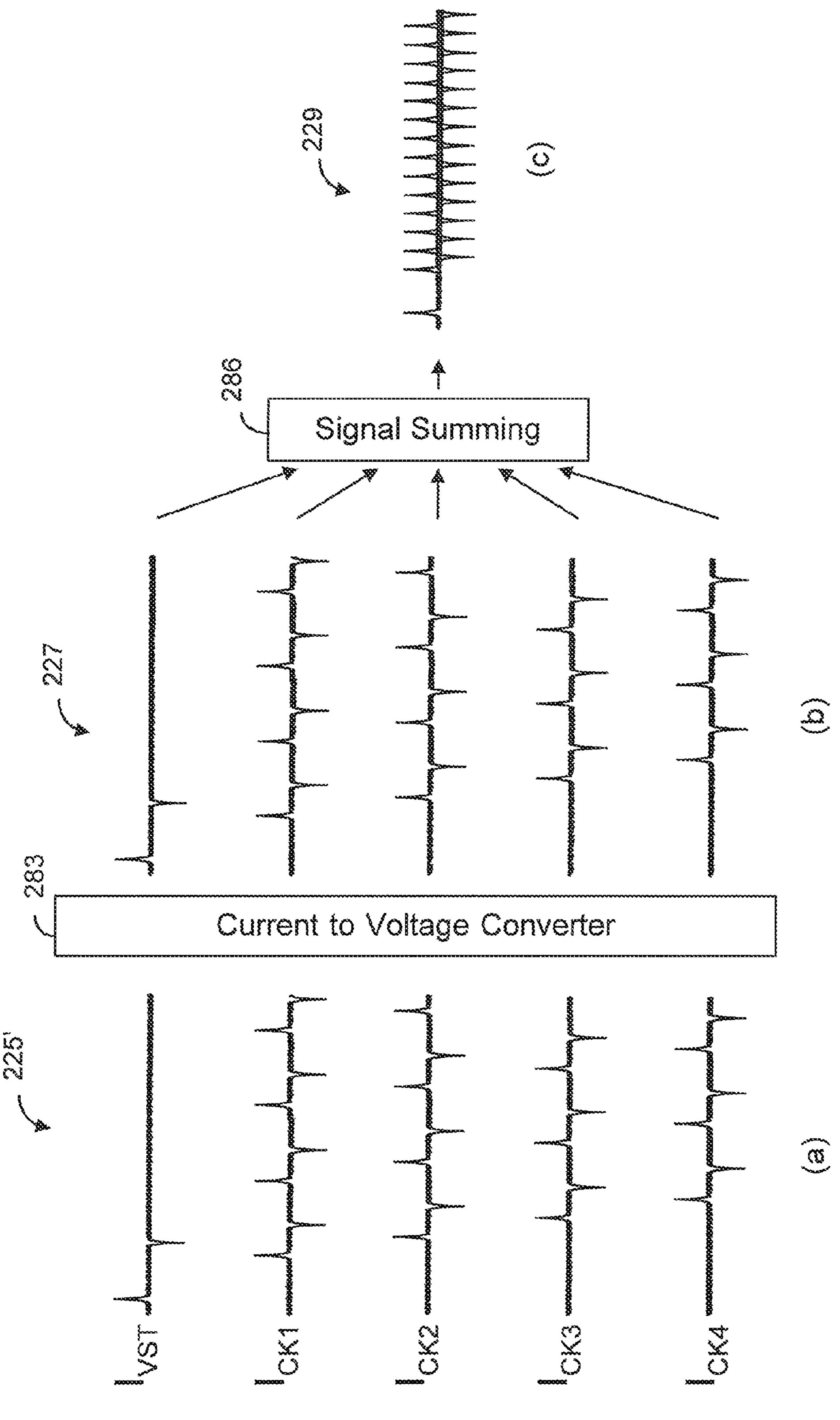
FIG. 12 shows the timing plots of the signals involved in the generation of compensation signal at various stages, according to another embodiment of the present invention.

It should be noted that the timing control signals VST, CK1, . . . as shown in FIG. 8(*a*) are obtained from the timing control circuit as voltage signals. It is possible to obtain the timing control signals from the timing control circuit as current signals, corresponding to the voltage signals. As shown in FIGS. 10-12, the current signals $I_{VST}$, $I_{CK1}$, $I_{CK2}$,. . . are current timing control signals corresponding to the voltage timing control signals VST, CK1, CK2, . . . . As shown in FIGS. 10(*a*) and 10(*b*), the current timing control signal $I_{CKn}$ has a series of positive and negative peaks corresponding to the leading and trailing edges of the waveform of the timing control signal CKn. Likewise, the current timing control signal $I_{VST}$ has a positive and a negative peak corresponding to the leading and trailing edges of the waveform of the start signal VST.

In a different embodiment of the present invention, the compensation signal CCS is derived from the current timing control signals $I_{VST}$, $I_{CK1}$, $I_{CK2}$, . . . . As shown in FIG. 11, the compensation-signal generator 280' may comprise a current-to-voltage converter 283, a signal summing device 286 and a signal inversion/adjustment device 288. The current-to-voltage converter 283 is configured to receive various current timing control signals such as start signal $I_{VST}$, clock signals $I_{CK1}$, . . . , $I_{CKn}$, from the timing control circuit 220 (see FIGS. 2*a* and 2*b*, without being level-shifted). The current-to-voltage converter 283 may comprise a resistor circuit to convert the current signal to a voltage signal. The voltage-converted signals are presented at the output of the current-to-voltage converter 283 on a plurality of signal lines 227. The voltage-converted signals are denoted as v', c1', . . . , cn' corresponding to the received current signals $I_{VST}$, $I_{CK1}$, . . . , $I_{CKn}$. Typically the current start signal $I_{VST}$ and the current clock signals $I_{CK}$ comprise a plurality of positive and negative peaks, corresponding to the leading edge and trailing edge of rectangular pulses. When a current signal is converted into a voltage signal, each of the peaks in the current signal produces a peak in the voltage-converted signal.

FIG. 12 shows the timing plots of the signals at some stages in the generation of compensation signal using the current timing control signals. In FIG. 12(*a*), the current timing control signals 225' obtained from the timing control circuit are $I_{VST}$, $I_{CK1}$, . . . . Each of the control signals comprises at least one positive peak and negative peak. After being converted from current to voltage in the current-to-voltage converter 283, the voltage-converted signal of $I_{VST}$ has a positive peak and a negative peak, whereas the voltage-converted signal of each of clock pulses $I_{CK1}$, $I_{CK2}$, . . . has a series of positive peaks and negative peaks occurring alternately as shown in the signals 227 in FIG. 12(*b*). The voltage-converted signals 227 are summed in a summing device 286 to become a summed voltage-converted signal 229 as shown in FIG. 12(*c*). It is followed that the amplitude of the summed voltage-converted signal 229 is inverted and adjusted or amplified to become a compensation signal, similar to the process as shown in FIG. 8(*d*).

In summary, the present invention provides a method and apparatus for generating a compensation signal for use in a display panel. The display panel comprises a display area and a circuit area adjacent but spaced from the display area. The circuit area is configured to receive control signals from a peripheral component which are electrically connected to the display panel but spaced from the display area. The peripheral component, according to various embodiments of the present invention, can be an external circuit 200 as shown in FIG. 2, the connector 250 as shown in FIGS. 6*a* and 6*b*, or the gate driver area 300 as shown in FIG. 3. All these peripheral components are spaced from the display area 400. According to various embodiments of the present invention, the compensation signal is derived from one or more control signals provided by the timing control circuit 220 in the external circuit 200. The control signals received from the timing control circuit are indicative of one or more clock signals arranged for controlling timing of the display components, and a start signal arranged for starting a frame in the image. The received control signals are then summed and inverted to become the compensation signal for compensating the common voltage in the display panel. In some embodiments, a high-pass filtering circuit or processor is used to obtain the time-derive signals of the received control signals, before or after the control signals are summed and inverted. In some embodiments, the amplitude of the compensation signal is also adjusted before the compensation signal is used to compensating the common voltage. In a different embodiment, the control signals received from the timing control circuit are current signals indicative of one or more clock signals arranged for controlling timing of the display components, and a start signal arranged for starting a frame in the image. The received current signals are converted into voltage signals and then summed and inverted to become the compensation signal for compensating the common voltage in the display panel.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A display apparatus, comprising:

a display panel area comprising a display area and a display control component;

a plurality of peripheral components spaced from the display panel area, the display panel area configured to receive a plurality of display signals and control signals from the peripheral components, the display control component arranged to provide timing signals indicative of the control signals, the display area configured to display an image representative of the display signals in relationship to a common voltage in response to the timing signals; and one or more signal lines arranged to provide a compensation signal to the display area to compensating the common voltage, wherein the compensation signal is indicative of a processed signal of one or more of the control signals obtained in the peripheral components, wherein said one or more of the control signals are indicative of one or more clock signals, and wherein the peripheral components comprise:

a timing control circuit configured to providing the control signals;

a voltage level shifter configured to shift a voltage level of the control signals before providing the control signals to the display panel area; and a compensation-signal generator configured to receive one or more of the control signals from the timing control circuit and configured for processing said one or more of the control signals to form the processed signal, and wherein said one or more of the control signals are also indicative of a start signal arranged for starting a frame in the image, and a plurality of clock signals are arranged for controlling a timing of the display components, said processing comprising:

high-pass filtering said one or more of the control signals for providing a plurality of high-pass filtered signals;

summing said high-pass filtered signals for providing a summed signal; and adjusting an amplitude of the summed signal to form the processed signal.

2. The display apparatus according to claim 1, wherein said adjusting comprises inverting a polarity of the summed signal.

3. The display apparatus according to claim 1, further comprising an external circuit electrically connected to the display panel, wherein the external circuit comprises the timing control circuit, the voltage level shifter and the compensation-signal generator, and wherein the display panel comprises a gate driver area adjacent to the display area, the gate driver area comprising a gate driver circuit configured to receive the control signals from the voltage level shifter, the gate driver circuit configured to provide a plurality of gate-line signals to the display components responsive to the control signals, the external circuit further comprising a source signal generator configured to receive the control signals from the timing control circuit and to provide the display signals to the display area responsive to the control signals.

4. The display apparatus according to claim 3, wherein the display area comprises a first side adjacent to the gate driver area and an opposing second side, and wherein the compensation signal is provided to the display area on one or both of the first side and the second side.

5. The display apparatus according to claim 3, wherein each of the display components comprises an electrode arranged to receive a display signal responsive to a gate-line signal; and a capacitor having one capacitor end connected to the electrode and an opposing capacitor end arranged to receive the compensation signal.

6. The display apparatus according to claim 5, wherein the compensation signal is further indicative of the common voltage.

7. The display apparatus according to claim 5, wherein the compensation signal is further indicative of a DC (direct current) voltage.

8. A method of compensating a common voltage in a display apparatus, the display apparatus comprising a display panel area and one or more peripheral components spaced from the display panel area, the display panel area comprising a display area and a display control component, the display panel area configured to receive a plurality of display signals and control signals from the peripheral components, the display control component arranged to provide timing signals indicative of the control signals, the display area configured to display an image representative of the display signals in relationship to the common voltage in response to the timing signals, said method comprising:

obtaining one or more of the control signals in the peripheral components;

processing said one or more of the control signals for generating a processed signal; and providing the processed signal to the display area for compensating the common voltage, wherein said one or more of the control signals are indicative of one or more clock signals, and wherein said one or more of the control signals are also indicative of a start signal and a plurality of clock signals, said processing comprising:

high-pass filtering said one or more of the control signals for providing a plurality of high-pass filtered signals;

inverting a polarity of the plurality of high-pass filtered signals into a plurality of inverted signals, and summing the plurality of inverted signals to form the process signal.

9. The method according to claim 8, wherein said one or more of the control signals further comprise a start signal, the start signal arranged for starting a frame in the image.

10. The method according to claim 8, further comprising adjusting an amplitude of the processed signal before providing the processed signal to the display area.

* * * * *